Aug. 23, 1966   O. KRAUSS ET AL   3,268,049
FUNCTION CONTROL ARRANGEMENTS HAVING COMMON DRIVE MEANS
Filed July 2, 1962   5 Sheets-Sheet 1

INVENTORS:
Otto Krauss, Joachim Heinbert,
Rudolf Schneider, Manfred Link
Leonhard Kraus
BY
Michael S. Striker
Attorney

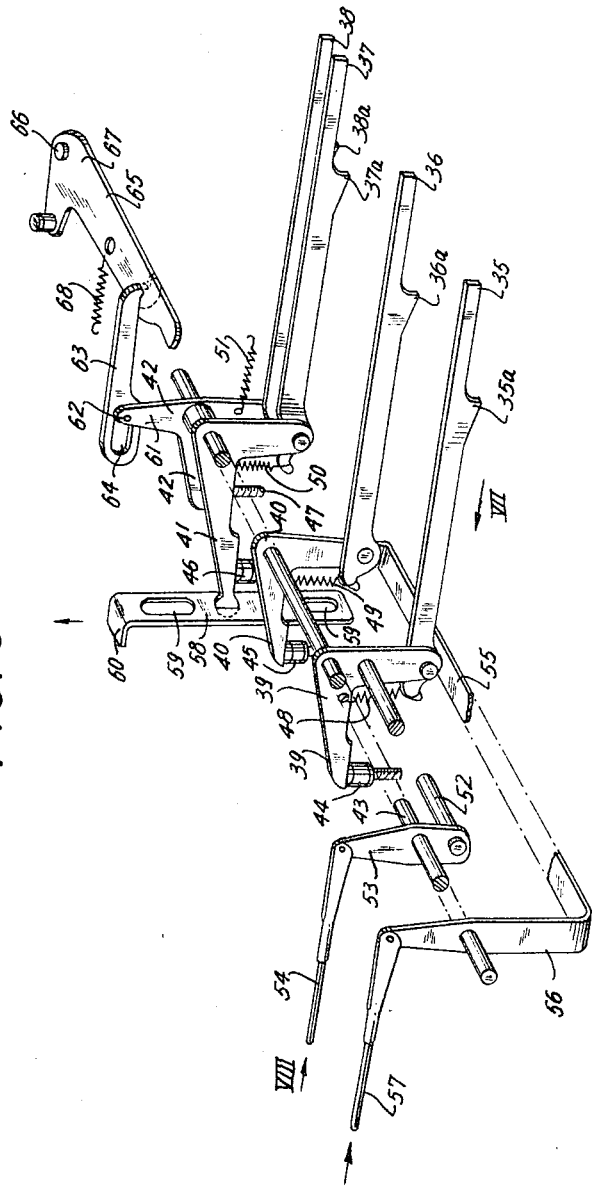

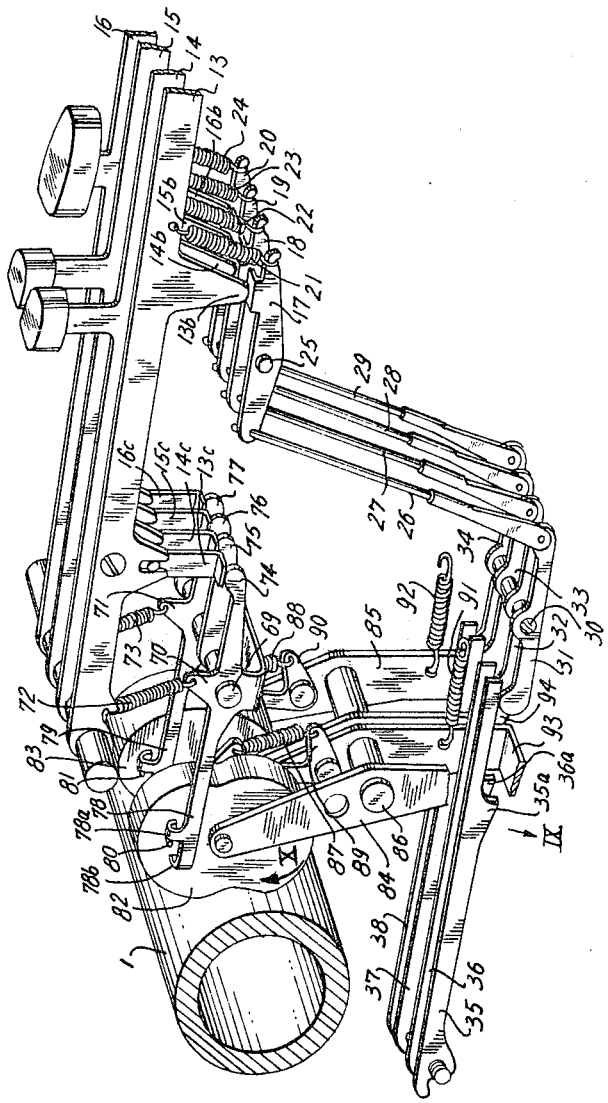

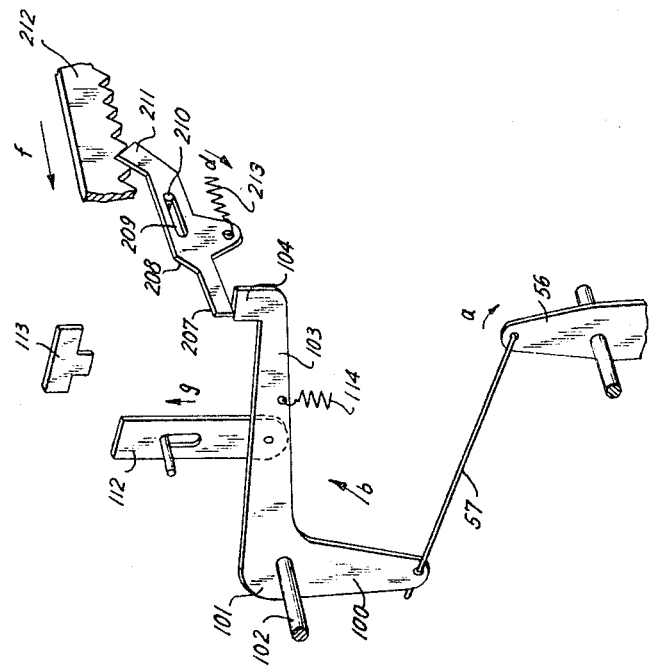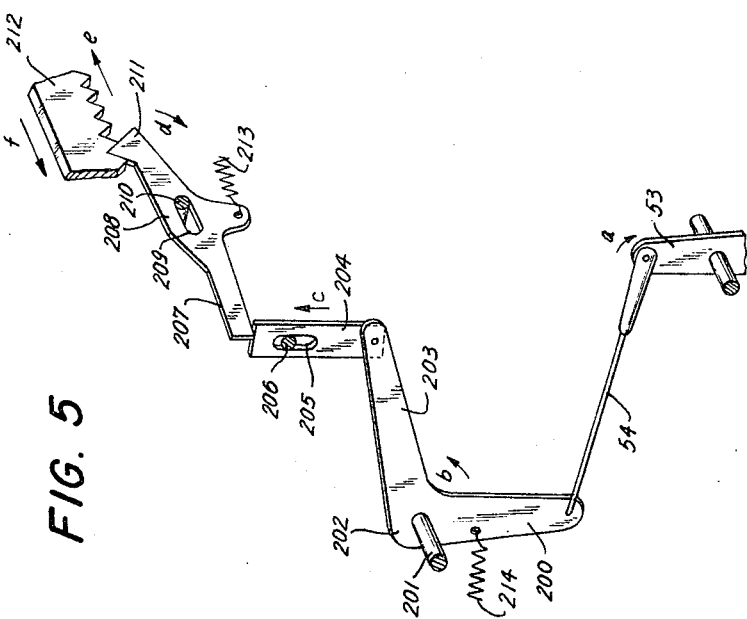

United States Patent Office

3,268,049
Patented August 23, 1966

3,268,049
FUNCTION CONTROL ARRANGEMENTS
HAVING COMMON DRIVE MEANS
Otto Krauss, Nurnberg, Joachim Meinherz, Kaufbeuren, Allgau, Manfred Link, Nurnberg, Leonhard Kraus, Coburg, and Rudolf Schneider, Berlin-Tempelhof, Germany, assignors to Max Grundig, Furth, Bavaria, Germany
Filed July 2, 1962, Ser. No. 211,466
15 Claims. (Cl. 197—17)

The present invention relates to a function control arrangement for power driven business machines, and more particularly to business machines having a typewriting mechanism driven by a power roll which drives the type lever actions.

Each type lever action is provided with an eccentric member which can be placed in engagement with the power roll so that the type lever action is actuated. Electric typewriters also require other functions to be carried out, such as tabulating, spacing between words, carriage return, and back spacing. In electric typewriters of the prior art, an individual eccentric member is provided for each of these operations, and is connected to the power roll when actuation of the respective device is required. Consequently in addition to the eccentric members cooperating with the power roll for driving the type lever actions, a number of additional eccentric members cooperating with a power roll is required for providing the driving force required for tabulating operations, spacing, back spacing, carriage return, and other necessary operations.

The several eccentric members, and the linkages connecting the same with the respective operating keys, require a great deal of space in the known electric typewriters, are difficult to assemble, and increase the cost of manufacture.

It is one object of the present invention to eliminate the disadvantages of known function control arrangement for power driven business machines, and to provide a simple and effective apparatus which is capable of controlling all necessary functions of the typewriter mechanism with few and simple parts.

Another object of the present invention is to provide a mechanism in which a single eccentric member cooperating with a power roll, controls several functions of the machine, and provides the driving force for operating, for example, spacing means, back spacing means, tabulating means, and carriage return means.

Another object of the present invention is to provide a simple and compact mechanism for operating spacing means, back spacing means, tabulating means, and carriage return means of an electric typewriting mechanism under control of correlated function keys.

Another object of the present invention is to locate the eccentric member from which several operations of the typewriter mechanism are controlled at a point of the power roll where the eccentric members for the type lever actions cannot be located.

With these objects in view, one embodiment of the invention comprises drive means including a movable, and preferably reciprocable drive member, and power means, such as a power roll for actuating the drive member; a plurality of actuating means for effecting different operations, such as spacing, tabulating, back spacing and carriage return in an electric typewriter; a plurality of coupling means separately and individually movable to and from a coupling position for connecting one of the actuating means with the drive member; and a plurality of operator controlled means individually connected with the coupling means for selectively moving individual coupling means to the coupling position. All operator controlled means are connected to the drive means so as to establish, when actuated, a driving connection between the power roll and the drive member. Consequently, each actuating means effects the correlated operation when selected by operation of the respective correlated operator controlled means.

The drive means preferably include a rotary power roll, an eccentric member cooperating with the power roll, and a reciprocable drive member which supports the eccentric member for rotation so as to be reciprocated when the eccentric member is turned by the power roll. The eccentric member is movable to and from a position engaging the power roll, and all operator controlled means, for example key levers, are connected with the eccentric member for causing movement of the same to a position in which it engages the power roll.

The coupling means are preferably elongated bars which can be longitudinally shifted, and have transverse coupling shoulders which are located in the path of movement of a portion of the drive member when the respective coupling bar is shifted by the correlated manually operated key lever to the coupling position. In this coupling position, the respective portion of the drive member engages the coupling shoulder of a coupling bar in coupling position, and shifts the bar longitudinally when the eccentric member is turned by the power roll. Such longitudinal shifting is used for initiating the respective operation of the actuating means which control the escapement mechanism for obtaining spacing steps of the paper carriage of the typewriter, the back spacing means, the tabulator stop, and coupling means which couple the carriage to a drive which returns the carriage to a terminal position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary perspective exploded view illustrating the actuating means which are controlled by the control arrangement shown in FIG. 1;

FIG. 4 is a fragmentary perspective view illustrating a modified embodiment of the control arrangement according to the present invention;

FIG. 5 is a fragmentary perspective view illustrating an escapement mechanism for effecting spacing steps of a paper carriage under control of the apparatus shown in FIG. 3;

FIG. 6 is a fragmentary perspective view of a tabulator device controlled by the apparatus shown in FIG. 3;

Figure 1:
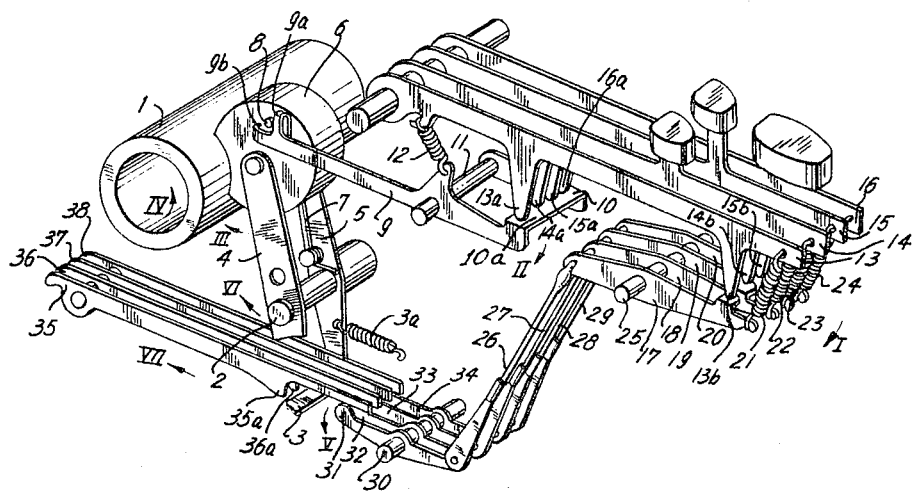
FIG. 1 is a fragmentary perspective view illustrating one embodiment of the control arrangement of the present invention.

Referring now to the drawings, and more particularly to FIG. 1, the rotary power roll 1 is mounted in the frame, not shown, of an electric typewriter mechanism, which may be part of an accounting machine. Power roll 1 is continuously driven by a motor as long as the machine is switched on. An eccentric member 6 is turnably mounted on a shaft connecting two levers 4 and 5 which are turnably mounted on a stationary shaft 2. A spring 7 engages a projection on the eccentric member 6 and urges the same to turn in the direction of the arrow III to a position abutting a stop portion 9a, see FIG. 2, of a double-armed lever 9, one arm of which is part of a U-shaped bridge structure which is turnably mounted on a stationary shaft 11, and is urged by a spring 12 to turn in counterclockwise direction.

The yoke portion 10a is located opposite a row of projections 13a, 14a, 15a and 16a of four key levers 13, 14, 15 and 16, each of which is provided with a manually operated key. Key lever 13 is connected to the space bar, not shown, and effects spacing steps of the paper carriage, not shown, key lever 14 effects tabulating operations, key lever 15 effects back spacing of the paper carriage, and key lever 16 effects the return of the paper carriage, when actuated. The return movement of the paper carriage also effects a line shifting operation.

Each key lever has a second projection 13b, 14b, 15b and 16b which are, respectively, located opposite transverse projections of correlated double-armed levers 17, 18, 19 and 20 turnably mounted on a stationary shaft 25. Springs 21, 22, 23 and 24 connect key lever means 13, 14, 15 and 16 to levers 17, 18, 19 and 20.

Each double-armed lever 17, 18, 19 and 20 is connected by an adjustable link 26, 27, 28, 29 to correlated double-armed levers 31, 32, 33 and 34 which are mounted on a stationary shaft 30. The free ends of levers 31, 32, 33, and 34 are located below, and respectively aligned with correlated coupling bar means 35, 36, 37 and 38 which pass below power roll 1 to the rear of the machine and have coupling shoulders, only coupling shoulders 35a and 36a being visible in FIG. 1. The coupling shoulders are arranged in a row, and located opposite a transverse coupling portion 3 of lever 5 which, together with lever 4 constitutes a drive member supporting eccentric coupling member 6 for rotation.

Springs 21, 22, 23 and 24 hold levers 31, 32, 33, 34 in positions supporting the couplings bar means 35, 36, 37 and 38 in a disengaged position in which the coupling shoulders thereof are located above the coupling portion 3. However, when one of the key levers is depressed by manual operation, the correlated lever 31, 32, 33 or 34 will be turned in counterclockwise direction as indicated by the arrow V, so that the respective coupling bar means will drop into a position in which its shoulder is located opposite the edge of coupling portion 3. A spring 3a acts on lever 5 to hold coupling portion 3 slightly spaced from the coupling shoulders of the coupling means 35, 36, 37 and 38.

Referring now to FIG. 3, four angular levers 39, 40, 41 and 42 are respectively articulated to the coupling bar means 35, 36, 37 and 38, and mounted for turning movement on a stationary shaft 43. The free arms of the angular levers 39, 40, 41 and 42 respectively rest on adjustable stops 44, 45, 46 and 47 so that the position of the coupling shoulders 35a, 36a, 37a and 38a may be adjusted, and also the ends of coupling means 35, 36, 37 and 38 may be properly positioned on levers 31, 32, 33 and 34.

Lever 39 is connected by a rod 52 to another lever 53 which is turnable on shaft 43. The free end of lever 53 is connected by a link 54 to the escapement mechanism of the paper carriage, as will now be described with reference to FIG. 5.

Link 54 is connected to the arm 200 of an angular lever 202 which is turnable on a shaft 201 and biased by a spring 214 to turn in clockwise direction. A connecting member 204 is articulated to the other arm 203 of lever 202, and has a slot 205 receiving a guide pin 206 so that the connecting member 204 moves straight in the direction of the arrow c when lever 202 is turned. The upper edge of connecting member 204 is engaged by the arm 207 of an escapement latch 208 under the action of a spring 213. Escapement latch 208 has a guide slot 209 receiving a guide pin 210, and a catch portion 211 cooperating with the teeth of a rack bar 212 which forms part of the paper carriage which is biased in conventional manner to move in the direction of the arrow f, such movement being normally prevented by the catch 211.

When coupling bar 35 is shifted in a direction of the arrow VII, lever 53 turns in clockwise direction and moves link 54 in the direction of arrow VIII so that lever 202 turns in counterclockwise direction as indicated by the arrow b, and moves connecting member 204 in the direction of the arrow c so that the latch lever 208 turns in the direction of the arrow d against the action of spring 213 and releases the rack bar 212. The paper carriage starts moving in the direction of the arrow f, but spring 213 immediately turns latch lever 208 in counterclockwise direction to a position engaging the notch behind the just released tooth so that the paper carriage performs a single step as is required for providing a space between two words or characters. As explained above, coupling bar means 35 is correlated with key lever 13 which is connected to the space bar, not shown.

Angular lever 40, which is articulated to the coupling bar means 36, is part of a U-shaped structure 55 whose other leg is a double-armed lever 56 turnably mounted on shaft 43 and articulated to a link 57, as shown in FIG. 3. Link 57 is connected to the tabulating means by which the paper carriage is tabulated, as will now be described with reference to FIG. 6.

Link 57 is secured to the arm 100 of an angular lever 101 which is turnable about a shaft 102. The free arm 103 of lever 101 has a projection 104 engaged by the arm 207 of latch lever 208 of the escapement mechanism under the action of spring 213. A tabulator stop 112 is also articulated to arm 103 and has a slot guided on the guide pin. Tabs 113, only one of which is shown, are set in a conventional manner on the paper carriage, not shown, on which the rack bar 212 is mounted.

When lever 101 is turned in counterclockwise direction of the arrow b against the action of spring 114, tabulator stop 112 is raised to a position located in the path of movement of set tabs 113, and latch lever 208 is simultaneously turned in the direction of the arrow d so that the rack bar 212 of the paper carriage is released, and the same starts its movement in the direction of the arrow f. As long as key lever 14 is depressed by the operator, the carriage is free to move, but such movement is stopped when tab 113 engages the raised tabulator stop 112. When lever 101 is permitted to return to its initial position, spring 213 turns latch lever 208 in counterclockwise direction to a position engaging rack bar 212 and stopping the paper carriage. Spring 114 returns lever 101 and tabulator stop 112 to the initial position of rest.

Angular lever 41 is connected to a shiftable member 58 having slot 59 engaged by guide pins so that member 58 moves along a straight path. Member 58 controls through its transverse projection 60 the back spacing device by which the paper carriage is retracted one step, as will now be described with reference to FIG. 7.

The rack bar 212 of the paper carriage is located opposite the back spacing member 404 which is mounted on a pin 402 projecting into a slot 403 so that member 411 is turnable and shiftable. A spring 404a holds member 404 in the illustrated position. Another pin 407 is secured to back spacing member 411 and projects into a slot 408 of a shifting member 409 which is biased by a spring 410. The end of member 409 is articulated to an angular lever 416 which is turnable about a stationary pivot pin 414 and is positioned to engage projection 60 of member 58.

A cam member 406 is mounted on member 409 and has a slot 413a receiving pin 411 of member 409. Thus, the position of member 406 can be adjusted, and then fixed by a screw 413. Cam member 406 has a cam track 406a including two straight end portions, and a slanted intermediate portion. Cam track 406a cooperates with a follower pin on back spacing member 404.

When member 58 is raised in the direction of the arrow k, member 409 is shifted in the direction of the arrow i, so that follower 405 slides on the slanted cam track, and back spacing member 404 is turned to a position engaging a tooth of rack bar 212 of the paper carriage. During further movement of member 409, pin 407 is engaged by the end of slot 408, and back spacing member 404 is shifted in the direction of the arrow i while engaging rack bar 212 so that the paper carriage is shifted backwards until pin 402 is engaged by the left end of slot 403. Springs 404a and 410 restore the back spacing device to the initial position of rest when member 58 is lowered, by lever 41 under the action of spring 50.

Lever 42 has an arm 61 carrying a pin 62 located in a slot 64 of a connecting member 63 whose free end is hook-shaped and engages a slot in the arm 65 of an angular lever 67 which is mounted for turning movement on a pin 66. Lever 67 is biassed by a spring 68, and controls the return of the paper carriage to its initial terminal position, as will now be described with reference to FIG. 8.

A pressure plate 300 has at one end thereof a lever arm articulated to lever 63 by pivot means 69, and at the other end thereof a blade portion 301 engaging a notch-shaped bearing in the member 312 under the action of a spring 302 which is connected by a screw 314 to a projecting portion 313 of plate 300. A pressure member 303 is adjustably mounted on plate 300 and abuts a bridge 304 to which pins 305 are secured which pass through a pulley 306 driven by a belt 307 from a drive motor, not shown. A cord 309 is secured to the paper carriage at one end, not shown, and secured to a spool wheel 308 at the other end thereof. Pins 305 couple spool wheel 308 to pulley 306 when shifted to a coupling position by pressure member 303.

When lever 67 is turned in counterclockwise direction by coupling bar means 38 through member 61 and 63, plate 300 pivots about blade 301, and pressure member 303 shifts members 304, 305 to a coupling position in which spool wheel 308 is coupled to the continuously running pulley 306 so that cord 309 is wound up on spool wheel 308 whereby the carriage is returned in the direction of the arrow r.

The mechanism operates as follows: When the space bar, not shown, is operated, key lever 13 is turned in the direction of the arrow I, so that projection 13a engages portions 10a of the releasable means 9, 10 and turns the same in the direction of the arrow II to a releasing position in which projection 9a releases stop pin 8 of eccentric coupling member 6 which turns under the action of spring 7 in the direction of the arrow III so that instead of the cutout 6a, the eccentric peripheral surface of coupling member 6 is located opposite power roll 1 and engaged by the same. Thus, eccentric coupling member 6 is coupled to power roll 1, which rotates in the direction of the arrow IV so that coupling member 6 is turned in the direction of the arrow III until stop 8 abuts on stop 9b of lever 9, stop 9b being now located in the circular path of movement of stop 8. When releasable means 9, 10 is returned to its normal position of rest by spring 12 upon release of the space bar and key lever 13, stop 8 engages stop 9a. The last part of the single revolution of eccentric coupling member 6 is effected by inertia while the cutout portion 6a moves into its normal postion. Since coupling member 6 is eccentric, drive member 4, 5 turns about shaft 2 in the direction of the arrow VI against the action of spring 3a, while its coupling portion 3 performs a movement to the left in the direction of the arrow VII.

When key lever 13 is depressed by operation of the space bar, its projection 13b moves downward and turns the correlated lever 17 in the direction of the arrow I, so that link 26 moves upward and turns the correlated lever 31 in the direction of the arrow V, permitting coupling bar means 35 to move downward into a coupling position in which shoulder 35a is located opposite coupling portion 3 which, as above described, performs a forward stroke in the direction of the arrow VII. Consequently, coupling bar means 35 is shifted in the direction of the arrow VII, and turns angular lever 39 with lever 53 in the direction of the arrow a, so that link 54 is shifted in the direction of the arrow VIII.

As explained with reference to FIG. 5, the linkage 202, 204 shifts the escapement latch 208 to a position in which latch 211 releases rack bar 212, permitting the carriage to move a single step whereupon spring 213 turns escapement latch 208 back to its blocking position engaging the next following notch in rack bar 212. Upon release of the space bar, all parts return to the initial positons under the action of the respective springs.

In the event that the space bar and key lever 13 are depressed to a lower position for the purpose of obtaining repeated spacing steps of the carriage, stop 9b is raised to a position located outside of the circular path of stop 8 so that eccentric member 6 performs several revolutions until the space bar is again released and stop 8 engages either stop 9b or stop 9a.

During each turning movement of the eccentric coupling member 6, drive member 4, 5 will be reciprocated, and engage during each forward stroke the coupling shoulder 35a of coupling bar means 35 which remains in the lower coupling position since portion 13b holds the linkage 17, 26, 31 in the position permitting the coupling bar means 35 to stay in the coupling position until the key lever 13 is permitted to return to its initial position of rest under the action of spring 12, whereupon spring 21 returns the linkage to its normal position in which coupling bar means 35 is raised and disengaged from the coupling portion 3 of the drive member 4, 5, 3.

The eccentric coupling member 6 is not only used for providing the driving force for effecting a spacing step of the carriage, but is also used for providing a driving force for tabulating operations, back spacing operations, and for releasing the carriage return motion.

When the tabulating key and key lever 14 are depressed by the operator, projection 14a effects release of the blocked eccentric coupling member 6, so that the same is turned by a spring 7 to a position engaged by the power roll 1 and rotated by the same while drive member 5, 3 performs a reciprocating motion. At the same time, projection 14b operates the linkage 18, 27, 32 permitting coupling bar means 36 to drop to the coupling position in which its shoulder 36a is engaged by portion 3 of the drive member 4, 5 during its forward stroke. When coupling bar means 36 is shifted in the direction of the arrow VII, levers 40 and 56 are turned in the direction of the arrow a, and as shown in FIG. 6, lever 101 turns in the direction of the arrow b to simultaneously place the tabulator stop 112 in the path of a tab 113 on the paper carriage and to turn escapement latch 208 to a position releasing the rack bar 212 of the paper carriage so that the same is free to move until tab 113 abuts tabulator stop 112. Thereby, the paper carriage is stopped in a tabulated position determined by the setting of tab 113.

Figure 2:
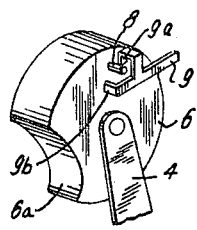
FIG. 2 is a perspective view illustrating a detail of the construction of FIG. 1.

When the back spacing key with key lever 15 is depressed, linkage 19, 28, 33 is operated to permit coupling bar means 37 to drop to the lower coupling position, while at the same time releasing means 10, 9, 9a is operated by projection 15a to move abutment 9a out of the blocking position shown in FIG. 2, and to a higher position in which abutment 9b is located in the circular path of movement of stop 8. After a single revolution of the eccentric coupling member 6, stop 8 will be blocked by abutment 9b, even if key lever 15 was not released by the operator. Otherwise, stop 8 will engage abutment 9a.

During a single revolution of the eccentric coupling member 6, coupling portion 3 performs a forward and a backward stroke, and during its forward stroke, it engages shoulder 37a of coupling bar means 37 and shifts the same in the direction of the arrow VII so that angular lever 41 is turned in clockwise direction and raises member 58 in the direction of the arrow k whereby back spacing member 404 is actuated to first perform a turning movement into a position engaging rack bar 212, and then a shifting movement in the direction of the arrow i to move the paper carriage one step.

If the back spacing key is depressed to a lower position, projection 15a turns releasing means 9, 10, to a position in which abutment 9b is located outward of the circular path of stop 8, so that eccentric member 6 is turned repeatedly until the back spacing key is again released by the operator, and projection 9b or projection 9a is located in the path of movement of stop 8, and stops eccentric member 6.

During several revolutions of the eccentric member 6, drive member 4, 5, 3 performs a forward stroke during each revolution of the eccentric member 6, and consequently the back spacing device is repeatedly operated and the carriage is moved in successive back spacing steps.

When the carriage return movement is desired and the carriage return key lever 16 is depressed by the operator, projection 16a turns the releasing means 9, 10 to a position in which abutment 9a releases stop 8 so that spring 7 turns the eccentric coupling member to a position engaging power roll 1 and driven by the same to operate the drive member 3, 4, 5. At the same time, the linkage 20, 29, 34 is operated to permit coupling bar means 38 to drop to the coupling position in which its shoulder is located in the path of movement of portion 3 of the drive member, resulting in shifting of the coupling bar means 38, and in turning of lever 32 which effects through member 63 turning of angular lever 65.

As explained with reference to FIG. 8, the coupling means 303, 304, 305 are actuated, and couple the spool wheel 308 to the continuously rotating pulley 306 so that the carriage is moved in the return direction by the cord 309. At the end of the carriage return movement, the line spacing device is actuated.

If the carriage return key and the back spacing key on levers 16 and 15, respectively, are simultaneously operated, the back spacing member 404 blocks the carriage movement, while spool wheel 308 is rotated, and a line spacing operation is obtained without the carriage return movement.

The above described embodiment of the invention provides a single eccentric coupling member 6 for coupling the spacing means, tabulating means, back spacing means and carriage return means to the power roll 1 of the drive means of the electric typewriter mechanism. It is possible to arrange the eccentric coupling member 6 at a portion of the power roll, which is not suitable for operation of the corresponding eccentric coupling members of the type lever actions. The same eccentric coupling member 6 may be used for providing the power for other functions and operations of the mechanism, for example for raising the type levers from the lower case position to the upper case position.

If the paper carriage is particularly long and heavy, as is required by certain accounting machines, two eccentric coupling members are advantageously provided, each of which controls more than one function of the machine.

In the embodiment ilustrated in FIG. 4, two eccentric coupling members 82 and 83 cooperate with the rotary power roll 1 of the machine. Key levers 13 to 16, levers 17 to 20, links 26 to 29, levers 31 to 34, operate in the same manner as described with reference to the embodiment of FIG. 3 to effect movement of the coupling bar means 35, to 38 to a lower coupling position.

Key levers 13 to 16 are provided with forked portions in which guide pins of members 13c, 14c, 15c and 16c are mounted. Members 13c to 16c are adjustably fixed on key levers 13 to 16 by means of adjusting screws.

A shaft 69 is located below key levers 13 to 16 and turnably supports two U-shaped releasing means 70 and 71 which are biassed by springs 72 and 73 to assume the illustrated position in which arms 74 and 75 of member 70, and arms 76 and 77 of member 71 abut transverse projections of members 13c to 16c, respectively. Member 70 and member 71 have arms 78 and 79, respectively, which are provided with abutments 78a and 78b as described with reference to FIG. 2. The abutments cooperate with stops 80 and 81, corresponding to stop 8 of FIG. 2, and are respectively fixed on the eccentric coupling members 82 and 83. Eccentric member 80 is turnably mounted on a shaft which connects two doublearmed levers 84 whose other ends are connected by a coupling portion 93 to form a U-shaped structure. The eccentric member 83 is mounted in the same manner on a shaft connecting two levers 85 which are also connected by a coupling portion 94 to form a U-shaped structure. Coupling portion 93 is located opposite shoulders 35a and 36a of coupling bar means 35 and 36, while coupling portion 94 is located opposite the shoulders of coupling bar means 37 and 38.

It is evident that turning movement of eccentric coupling member 82 will effect a reciprocating movement of coupling portion 93, while turning movement of eccentric coupling member 83 will effect a reciprocating movement of coupling portion 94. When one of the coupling bar means 35 to 38 is in its lower coupling position, it will be shifted and operate the devices shown in FIGS. 5, 6, 7 and 8 through the actuating means shown in FIG. 3.

An angular lever 89 is mounted on levers 84 and abuts on a projection on eccentric member 82 under the action of spring 87, so as to urge eccentric coupling member 82 to turn in the direction of the arrow X. Such turning movement is normally blocked by abutment 78a against which stop 80 abuts. A corresponding angular lever 90 is mounted on lever 85 to urge eccentric member 83 to turn in the direction of the arrow X so that stop 81 abuts the abutment on lever 79.

When one of the key levers, for example the tabulating key lever 14 is operated, the coupling bar means 36 is released by lever 32 and drops in the direction of the arrow IX to the lower coupling position thereof so that shoulder 36a is located in the path of movement of coupling portion 93.

At the same time, member 14c depresses arm 75, so that lever 78 is raised and projection 78a releases stop 80, permitting member 89 to turn eccentric member 82 to a position in which it is engaged and rotated by power roll 1 in the direction of the arrow X. A second stop 80, not shown, is provided on eccentric coupling member 82 in a position diametrically opposite the illustrated stop 82, so that eccentric member 82 will be stopped after turning through 180° when the second stop 80 abuts the abutment 78b on lever 78. Upon release of tabulating key lever 14, lever 78 drops, and stop 80 engages abutment 78a. Eccentric member 82 is provided with two diametrically arranged cutouts, and consequently has two positions of rest in which it is spaced from the power roll 1.

During turning of eccentric member 82 through 180°, the eccentric peripheral surface thereof effects a reciprocating motion of coupling portion 93 which engages shoulder 36a and actuates the tabulating means.

A corresponding operation is obtained when key lever 13 is depressed by the space bar, not shown.

Figure 7:
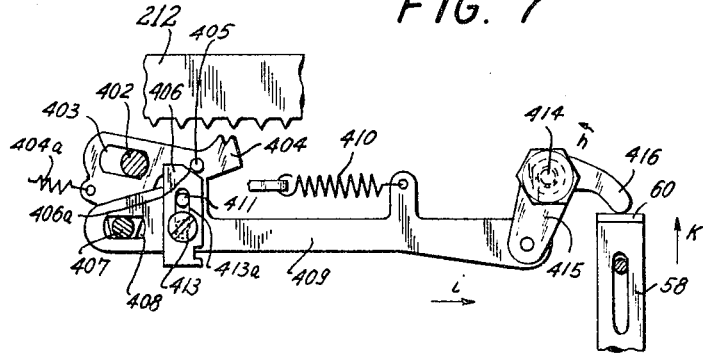
FIG. 7 is a fragmentary perspective view of a back spacing device controlled by the apparatus shown in FIG. 3.
Figure 8:
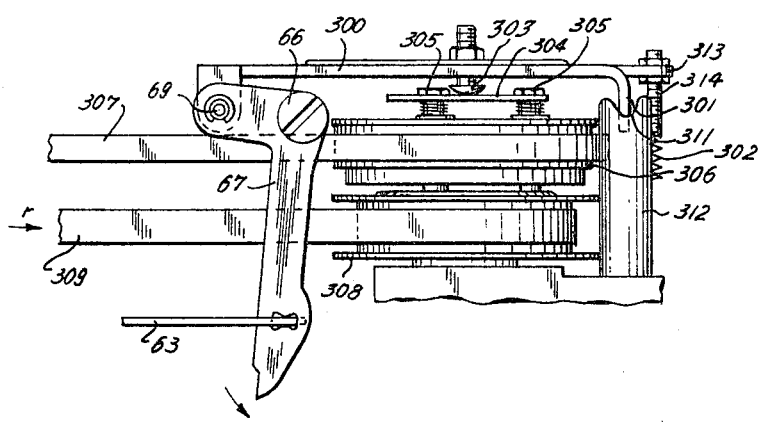
FIG. 8 is a plan view illustrating a carriage return device controlled by the apparatus shown in FIG. 3.

As explained above, the coupling bar means 37, 38 are respectively connected to the back spacing means shown in FIG. 7 and to the carriage return means shown in FIG. 8. These two coupling means are correlated with the second eccentric coupling member 83 which has only a single cutout and turns through 360°, as described with reference to the eccentric coupling member 6 shown in FIG. 1. When one of the key lever 15 or 16 is depressed, lever 79 is turned to a position in which the respective abutment releases stop 81, members 88, 90 effect turning of the eccentric member 83 to the position in which it is engaged and rotated by the power roll 1, and drive member 85, 94 reciprocates to shift the coupling bar means 37 or 38 which is in its coupling position due to the selective operation of key levers 15 or 16. Springs 91 and 92 urge the drive members to perform the return stroke after having been moved in forward actuating stroke by the respective eccentric coupling member 82 or 83.

By adjustment of the adjusting stop means 44 to 47, the exact position of each coupling shoulder on the coupling means 35 to 38 relative to the stroke of members 93, 94 and 3 can be determined so that each coupling bar means is engaged and shifted by the respective drive member at a desired movement of the forward stroke of the drive member.

The power roll 1 is covered with a rubber envelope and cooperates with a friction surface on the eccentric coupling member. However, the power roll may also be of the type having peripheral teeth cooperating with corresponding teeth on coupling members.

It will be understood that each of the elements described above, or two or more together, may also find a useful application in other types of function control arrangements for power driven business machines differing from the types described above.

While the invention has been illustrated and described as embodied in a mechanism for controlling several functions and operations of the typewriter mechanism from a single eccentric coupling member cooperating with the power roll of the machine, it is not intended to be limited to the details shown, since various modifications and structural changes may be made without departing in any way from the spirit of the present invention.

With out further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a business machine, in combination, drive means including a rotary power roll, a coupling member cooperating with said power roll, and a drive member connected to said coupling member so that said drive member reciprocates when said coupling member is moved by said power roll; a plurality of actuating means located rearwardly of said power roll for effecting different operations in the business machine; a plurality of coupling means extending below said power roll and having rear ends connected to said actuating means and front end having coupling portions located forwardly of said power roll, each coupling means being separately movable to and from a coupling position for connecting the coupling portion thereof with said drive member; and a plurality of operator controlled means respectively associated with said operations and jointly connected to said coupling member for effecting movement of the same to a position engaging said power roll and individually connected with said coupling means for selectively moving individual coupling means to said coupling position so that each actuating means is driven by said drive member to effect the respective correlated operation when selected by operation of the correlated operator controlled means.

2. In a business machine, in combination, drive means including a rotary power roll, a coupling member movable to and from a position engaging said power roll, and a drive member connected to said coupling member so that said drive member reciprocates when said coupling member is moved by said power roll; a plurality of actuating means for effecting different operations in the business machine; a carriage return device operatively connected to and actuated by one of said actuating means; a plurality of coupling means, each coupling means being separately movable to and from a coupling position for connecting only one of said actuating means with said drive member; and a plurality of operator controlled means respectively associated with said operations and jointly connected with said coupling member for effecting movement of the same to the position engaging said power roll and individually connected with said coupling means for selectively moving individual coupling means to said coupling position so that each actuating means is driven by said drive member to effect the respective correlated operation when selected by operation of the correlated operator controlled means.

3. In a business machine, in combination, drive means including a rotary power roll, a coupling member cooperating with said power roll, and a drive member supporting to said coupling member for rotation so that said drive member reciprocates when said coupling member is turned by said power roll; a plurality of actuating means for effecting different operations in the business machine; a plurality of coupling means having coupling shoulders, each coupling means being separately movable between an inoperative position and a coupling position in which said shoulder is located in the path of movement of said drive member so as to be shifted by the same, each coupling means being operatively connected to one of said actuating means, respectively, in such a manner that the same is operated when the respective coupling means is shifted by said drive member; a plurality of operator controlled means respectively associated with said operations and jointly connected with said coupling member for effecting movement of the same to a position engaging said power roll; and a plurality of linkage means respectively connecting each operator controlled means with one of said coupling means for selectively moving individual coupling means to said coupling position so that each actuating means is driven by said drive member to effect the respective correlated operation when selected by operation of the correlated operator controlled means.

4. In a business machine, in combination, drive means including a power roll, a coupling member movable to and from an operative position engaged by said power roll, and a drive member operated by said coupling member to reciprocate when said coupling member is in said operative position; a plurality of actuating means; a spacing device; a tabulating device; a backspacing device; a carriage return device, each of said devices being operatively connected to one of said actuating means, respectively, so that each actuating means effects a different operation in the business machine; a plurality of coupling means, each coupling means being separately movable to and from a coupling position for connecting only one of said actuating means with said drive member; and a plurality of operator controlled means respectively associated with said operations and individually connected with said coupling means for selectively moving individual coupling means to said coupling position and being all operatively connected with said coupling member for placing the same in said operative position when a selected coupling means is in said coupling position so that each actuating means is driven by said drive member to effect the respective correlated operation when selected by operation of the correlated operator controlled means.

5. In a business machine, in combination, drive means including a rotary power roll, two eccentric coupling members cooperating with said power roll, and being movable to and from a position engaging said power roll, and two drive members respectively supporting said coupling members for rotation so that each of said drive members reciprocates when the respective coupling member is moved by said power roll; a plurality of actuating means for effecting different operations in the business machine; a plurality of coupling means, some of said coupling means being separately movable to and from a coupling position for connecting only one of one group of said actuating means with one of said drive members, and the other coupling means being separately movable to and from a coupling position for connecting only one of another group of said actuating means with the other drive member; and a plurality of operator controlled means respectively associated with said operations, some of said operator controlled means being jointly connected with one of said eccentric coupling members for effecting movement of the same to the position engaging said power roll, and the other of said operator controlled means being jointy connected with the other eccentric coupling member for effecting movement of the same to the position engaging said power roll, said operator controlled means being individually connected with said coupling means for selectively moving individual coupling means to said coupling position before said coupling members engage, respectively, said power roll so that each actuating means is driven by said drive member to effect the respective correlated operation when selected by operation of the correlated operator controlled means.

6. In a business machine, in combination, drive means including a rotary power roll, an eccentric coupling member movable to and from a position engaging said power roll, and a drive member supporting said eccentric coupling member for rotation so that said drive member reciprocates when said coupling member is moved by said power roll, said drive member having a coupling portion; a plurality of actuating means for effecting different operations in the business machine; a plurality of coupling means having coupling shoulders, each coupling means being separately movable between an inoperative position and a coupling position in which said shoulder is located in the path of movement of said coupling portion of said drive member so as to be shifted by the same, each coupling means being operatively connected to one of said actuating means, respectively, in such a manner that the same is operated when the respective coupling means is shifted by said drive member; a plurality of operator controlled means jointly connected with said coupling member for effecting movement of the same to a position engaging said power roll; and a plurality of linkage means respectively connecting each operator controlled means with one of said coupling means for selectively moving individual coupling means to said coupling position so that each actuating means is driven by said drive member to effect the respective correlated operation when selected by operation of the correlated operator controlled means.

7. A business machine as set forth in claim 6 wherein each of said coupling means is a coupling bar having a projection with said coupling shoulder; and wherein in each of said linkage means includes a lever having a normal position holding a correlated coupling bar in an inoperative position in which said coupling shoulder of the same is retracted from the path of movement of said coupling portion of said drive member, each of said levers being turned when the correlated operator controlled means is operated so as to permit movement of the respective coupling bar to said coupling position.

8. A machine as set forth in claim 7 wherein each operator controlled means includes a key lever and a key on said key lever.

9. In a business machine, in combination, drive means including a rotary power roll, an eccentric coupling member cooperating with said power roll, a drive member supporting said eccentric coupling member for rotation, spring means for turning said eccentric coupling member to a position engaged by said power roll, a supporting shaft supporting said drive member for angular movement so that said drive member reciprocates when said eccentric coupling member is engaged and rotated by said power roll, releasable means normally blocking turning movement of said eccentric coupling member under the action of said spring means and being movable to a releasing position permitting turning of said coupling member; a plurality of actuating means for effecting different operations in the business machine; a plurality of coupling means, each coupling means being separately movable to and from a coupling position for connecting only one of said actuating means with said drive member; and a plurality of operator controlled means jointly connected with said releasable means for effecting, when actuated, movement of said releasable means to said releasing position, each operator controlled means being individually connected with said coupling means for selectively moving individual coupling means to said coupling position so that each actuating means is driven by said drive member to effect the respective correlated operation when selected by operation of the correlated operator controlled means.

10. A machine as set forth in claim 9 wherein said eccentric coupling member has at least one stop, and wherein said releasable means includes a releasing member having a first abutment engaged by said stop under the action of said spring means for blocking said coupling member when said operator controlled means are all in a normal position of rest and a second abutment located in the path of movement of said stop when one of said operator controlled means is moved to an actuated position.

11. A machine as set forth in claim 10 wherein each of said operator controlled means includes a key lever having a projection, said projections being aligned, and wherein said releasable means includes a portion extending opposite said aligned projections across said key levers, and being engaged by the projection of each of said key levers when the same is operated whereby said releasing means is moved to said releasing position.

12. A machine as set forth in claim 10 wherein at least one operator controlled means is movable to a repeat actuation position for moving said releasable means to a position in which said abutments are both located outside of the path of movement of said stop of said eccentric coupling member during rotation of the same so that said eccentric coupling member performs successive revolutions and repeatedly actuates said drive member until said operator controlled means is moved out of said repeat actuation position.

13. In a business machine, in combination, drive means including a rotary power roll, an eccentric coupling member cooperating with said power roll, a drive member supporting said eccentric coupling member for rotation, spring means for turning said eccentric coupling member to a position engaged by said power roll, a supporting shaft supporting said drive member for angular movement so that said drive member reciprocates when said eccentric coupling member is engaged and rotated by said power roll, releasable means normally blocking turning movement of said eccentric coupling member under the action of said spring means and being movable to a releasing position permitting turning of said coupling member; a plurality of actuating means; a spacing device; a tabulating device; a backspacing device; a carriage return device, each of said devices being operatively connected to one of said actuating means, respectively, so that each actuating means effects a different operation in the business machine; a plurality of coupling means, each coupling means being separately movable to and from a coupling position for connecting only one of said actuating means with said drive member; and a plurality of operator controlled means jointly connected with said releasable means for effecting, when actuated, movement of said releasable means to said releasing position, each operator controlled means being individually connected with said coupling means for selectively moving individual coupling means to said coupling position so that each actuating means is driven by said drive member to effect the respective correlated operation when selected by operation of the correlated operator controlled means.

14. In a business machine, in combination, drive means including a rotary power roll, an eccentric coupling member cooperating with said power roll, a drive member supporting said eccentric coupling member for rotation, spring means for turning said eccentric coupling member to a position engaged by said power roll, a supporting shaft supporting said drive member for angular movement so that said drive member reciprocates when said eccentric coupling member is engaged and rotated by said power roll, releasable means normally blocking turning movement of said eccentric coupling member under the action of said spring means and being movable to a releasing position permitting turning of said coupling member; a plurality of actuating means for effecting different operations in the business machine; a plurality of coupling means having coupling shoulders, each coupling means being separately movable between an inoperative position and a coupling position in which said shoulder is located in the path of movement of said drive member so as to be shifted by the same, each coupling means being operatively connected to one of said actuating means, respectively, in such a manner that the same is operated when the respective coupling means is shifted by said drive member; and a plurality of operator controlled means jointly connected with said releasable means for effecting, when actuated, movement of said releasable means to said releasing position, each operator controlled means being individually connected with said coupling means for selectively moving individual coupling means to said coupling position so that each actuating means is driven by said drive member to effect the respective correlated operation when selected by operation of the correlated operator controlled means.

15. In a business machine, in combination, drive means including a rotary power roll, an eccentric rotary coupling member movable to and from a position engaging said power roll, and a drive member supporting said eccentric coupling member for rotation so that said drive member reciprocates when said coupling member is rotated by said power roll, said drive member having a drive portion; a plurality of actuating means for effecting different operations in the business machine; a plurality of coupling means, each coupling means being separately movable between an inoperative position and a coupling position located in the path of movement of said drive portion of said drive member so as to be shifted by the same, each coupling means being operatively connected to one of said actuating means, respectively, in such a manner that the same is operated when the respective coupling means is shifted by said drive member; a plurality of operator controlled means jointly connected with said coupling member for effecting movement of the same to a position engaging said power roll; and a plurality of means respectively connecting each operator controlled means with one of said coupling means for selectively moving individual coupling means to said coupling position before said coupling member engages said power roll and is moved by the same so that each actuating means is driven by said drive member to effect the respective correlated operation when selected by operation of the correlated operator controlled means.

References Cited by the Examiner
UNITED STATES PATENTS

| | | | |
|---|---|---|---|
| 1,955,987 | 4/1934 | Trego | 197—14 |
| 2,717,686 | 9/1955 | Seeber | 197—14 |
| 2,891,649 | 6/1959 | Peterson | 197—14 |
| 2,965,212 | 12/1960 | Toggenburger | 197—176 |
| 3,063,536 | 11/1962 | Dirks | 197—19 |
| 3,086,635 | 4/1963 | Palmer | 197—16 |

ROBERT E. PULFREY, *Primary Examiner.*

F. A. LUKASIK, E. S. BURR, *Assistant Examiners.*